United States Patent
El Yamani et al.

(10) Patent No.: US 6,592,042 B1
(45) Date of Patent: Jul. 15, 2003

(54) METHOD FOR MAKING A CARD WITH INTEGRATED CIRCUIT

(75) Inventors: Hayat El Yamani, L'Hay les Roses (FR); Yves Delserieys, Villeneuve la Garenne (FR); Jean-Luc Poirier, Orsay (FR)

(73) Assignee: Schlumberger Systemes, Montrouge Cedex (FR)

(*) Notice: Subject to any disclaimer, the term of this patent is extended or adjusted under 35 U.S.C. 154(b) by 0 days.

(21) Appl. No.: 09/601,688

(22) PCT Filed: Feb. 12, 1999

(86) PCT No.: PCT/FR99/00323

§ 371 (c)(1),
(2), (4) Date: Oct. 12, 2000

(87) PCT Pub. No.: WO99/41702

PCT Pub. Date: Aug. 19, 1999

(30) Foreign Application Priority Data

Feb. 13, 1998 (FR) .............................. 98 01755

(51) Int. Cl.⁷ .............................................. G06K 19/00
(52) U.S. Cl. ...................... 235/487; 235/492; 235/493; 235/383
(58) Field of Search ................... 235/385, 487, 235/379, 380, 382, 383, 492, 493; 29/829, 827; 902/29

(56) References Cited

U.S. PATENT DOCUMENTS

| | | | | |
|---|---|---|---|---|
| 4,825,054 A | * | 4/1989 | Rust et al. | 235/380 |
| 5,134,773 A | * | 8/1992 | LeMaire et al. | 174/52.2 |
| 5,438,750 A | * | 8/1995 | Venambre | 235/488 |
| 5,671,525 A | * | 9/1997 | Fidalgo | 235/488 |
| 5,852,289 A | * | 12/1998 | Masahiko | 235/380 |
| 5,889,941 A | * | 3/1999 | Tushie et al. | 235/380 |
| 6,107,010 A | * | 8/2000 | Corniglion et al. | 235/488 |
| 6,402,028 B1 | * | 6/2002 | Graham et al. | 235/380 |
| 6,412,701 B1 | * | 7/2002 | Kohama et al. | 235/488 |

FOREIGN PATENT DOCUMENTS

JP  2001307056 A  * 11/2002

* cited by examiner

Primary Examiner—Karl D. Frech
Assistant Examiner—Daniel Walsh
(74) Attorney, Agent, or Firm—Cohen, Pontani, Lieberman & Pavane

(57) ABSTRACT

A method for decorating and personalizing a card by printing a decorative element and personalizing data on one surface of the card body. The surface is then coated with a protective layer, and an integrated circuit is implanted in the card body. The personalizing data of the card body is identified and written into the integrated circuit storage zone data corresponding to the personalizing data of the card body.

7 Claims, 2 Drawing Sheets

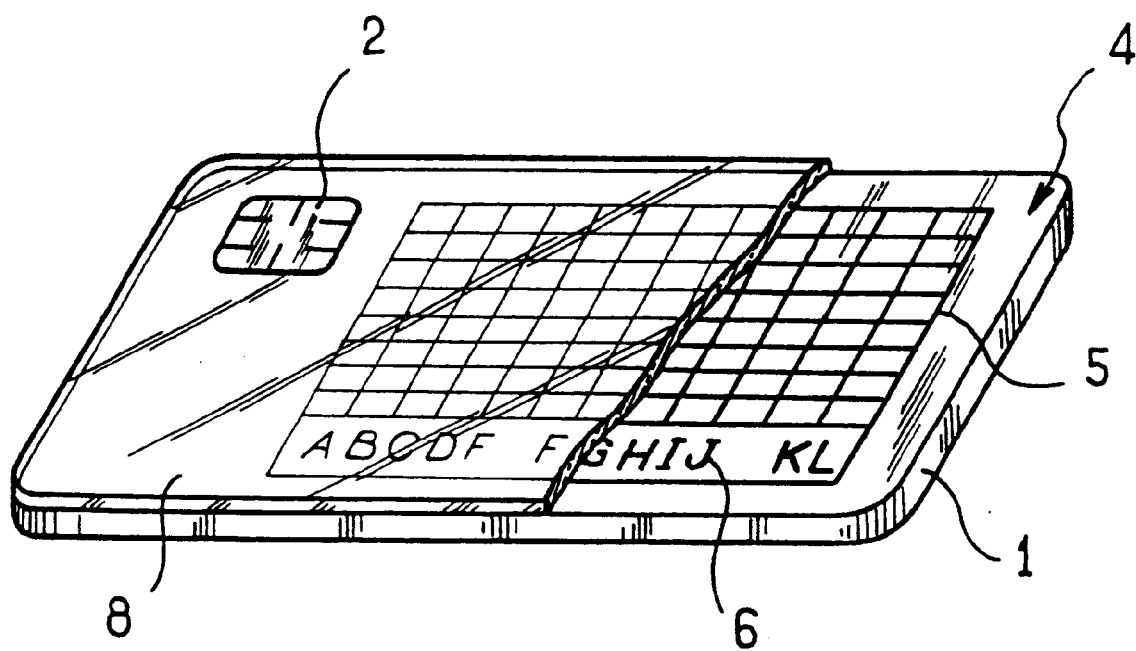
FIG_2

METHOD FOR MAKING A CARD WITH INTEGRATED CIRCUIT

FIELD OF THE INVENTION

The present invention concerns a method for the production and graphical personalization of an integrated circuit card, such as a bank card, a portable telephone card, a prepaid card, an identification card, etc.

BACKGROUND OF THE INVENTION

A common method for producing integrated circuit cards consists of printing, if necessary, a decorative element on one surface of the card body, preferably coating the decorative element with a protective layer, implanting the integrated circuit into the card body, printing personalizing data such as a serial number and/or information related to the card holder, particularly in alphanumeric or bar code form, and writing the data corresponding to the personalizing data of the card body into a storage area of the integrated circuit. The integrated circuit is provided with conductive regions that extend into the decorative element or the protective layer in such a way that when the personalizing data is printed by heat transfer, the print head hits the conductive regions. Hence, the print head, as well as the conductive regions, risk being damaged. To eliminate this drawback, it has been attempted to completely bury the conductive regions into the card body or to provide a floating mount for the head for printing the graphical personalizing data, but the solutions considered have not proven satisfactory.

The production method is thus fast and simple to implement.

An additional drawback of the known production method resides in the fact that the personalizing data printed on the protective layer of the decorative element is exposed to external stresses such that it risks being erased, for example accidentally as a result of repeated rubbing, or intentionally by means of a solvent for purposes of an unauthorized modification of the data. In order to improve the durability of this data, it has been considered to inscribe the personalizing data by laser etching the surface of the card body or by plastically deforming the card body in order to form an embossed inscription. Inscriptions produced this way cannot be erased. However, these inscription methods require lengthy operations and expensive equipment, which increases the cost price of cards personalized in this way.

Furthermore, with the known method, in order for the data printed on the card body to be certain to correspond to the data written in the storage area, the writing of the personalizing data into the storage area and the printing of the corresponding personalizing data are done card by card, and synchronously. The method is therefore not very flexible. Moreover, the electrical personalization step, i.e., the writing of the personalizing data into the storage area, is generally a faster operation than the graphical personalization step, i.e., the printing of the personalizing data. The result is that the machine performing the electrical personalization operates at less than full capacity in order to avoid an overrun of the graphical personalization machine.

SUMMARY OF THE INVENTION

According to one aspect of the invention, a method for producing a card comprises, in order, the following steps. Personalizing data is printed onto one surface of the card body, and an integrated circuit is implanted into the card body. The data corresponding to the personalizing data of the card body is written into a storage area of the integrated circuit.

The printing of the personalizing data thus being done prior to the installation of the integrated circuit, the print head does not risk being damaged, and it is not necessary to provide a special mount for the print head.

Advantageously, a decorative element is printed simultaneously with the personalizing data.

The production method is thus fast and simple to implement.

The method preferably comprises, subsequent to the step for printing the decorative element and the personalizing data, a step for coating the surface of the card body with a protective layer.

The protective layer thus provides protection of the personalizing data, and if necessary of the decorative element, both during the production of the card and during its subsequent utilization. The personalizing data cannot be accidentally erased, and any attempt to modify the personalizing data requires the removal of the protective layer, which makes it very difficult to modify the card without destroying it.

According to another aspect of the invention, the method comprises, prior to the step for writing into a storage area, the step for recognizing the personalizing data on the card body.

Thus, as a result of the preliminary recognition of the data on the card body, the electrical personalization step can be performed any time after the graphical personalization step. The method is therefore particularly flexible. Moreover, it is possible to perform the printing of the personalizing data onto batches of cards, for example on plates containing several cards, then to individually perform the writing of the data corresponding to the previously recognized personalizing data into the storage area of the integrated circuit. The production process is thus rationalized, making it possible to take full advantage of the capabilities of the machines used to implement it. The invention also makes it possible to perform the graphical personalization and the electrical personalization at different locations.

Other characteristics and advantages of the invention will emerge through the reading of the following description of a particular non-limiting embodiment of the invention.

BRIEF DESCRIPTION OF THE DRAWINGS

Reference will be made to the attached drawings, in which:

FIG. 2 is a view in perspective, with a cutaway, of a card corresponding to the method of the invention.

DETAILED DESCRIPTION OF THE DRAWINGS

Figure 1:
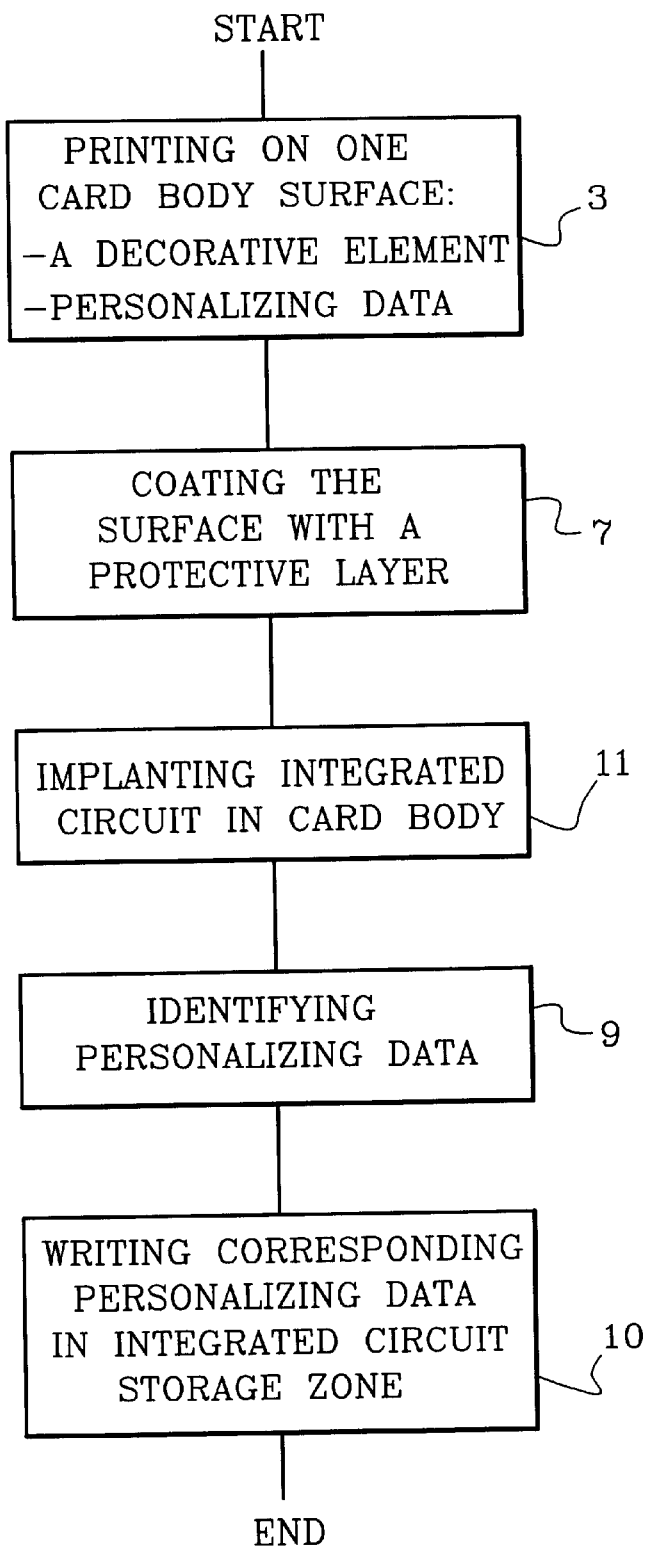
FIG. 1 is a block diagram of an embodiment of the production method according to the invention.

In reference to the figures, the method described herein is intended for the production of cards comprising a card body 1.

According to the embodiment illustrated, the method comprises a step 3 for simultaneously printing, on one surface 4 of the card body 1, a decorative element 5, in this case in the form of a grid, and personalizing data 6. In the sense of the invention, personalizing data is understood to mean any identifying data such as a serial number, the card holder's name or identification code, the card holder's address, a bar code, a photograph, fingerprints, etc. The simultaneous printing of the decorative element and the personalizing data is performed, for example, by a digital printing machine.

A step 7 for coating the surface 3 of the card body 1 with a transparent protective layer 8 follows the printing step 3. In a way that is known per se, the protective layer 8 can be deposited by offset varnishing or by serigraphy, or in the form of a film such as a polyvinyl chloride film.

After the coating, an integrated circuit 2 is inserted into the card body 1 during an implantation step 11, for example by machining a cavity into the card body and gluing in a module comprising the integrated circuit.

A step 9 for recognizing the personalizing data 6 printed on the surface 3 is then performed. The recognition of the personalizing data is performed optically, for example by laser in the case of a bar code, by a camera or other means.

Personalizing data corresponding to the personalizing data 6 is then written into a storage area of the integrated circuit during a step 10. The decorating and personalizing process is then finished.

It is understood that the invention is not limited to the embodiment described and that variants of the embodiment may be contributed to it without going beyond the scope of the invention as defined by the claims.

In particular, although the invention has been described in relation to a card comprising only an integrated circuit, the invention is also applicable to a card comprising both an integrated circuit and a magnetic strip. In this case, it is possible either to perform only one recognition of the graphical personalization, then perform the electrical personalization and the magnetic personalization in sequence, or to perform a recognition prior to each of these operations, performed separately.

Although in the method described, the printing of the decorative element and the printing of the personalizing data are performed simultaneously, the decorative element and the personalizing data could be printed successively.

Although the method according to the invention has been described as comprising a step for recognizing the personalizing data, the graphical personalization and electrical personalization steps can be performed synchronously card by card so that the recognition step is not necessary.

What is claimed is:

1. Method for producing an integrated circuit card, characterized in that it comprises, in order, the following steps:
   printing a personalizing data (6) onto one surface (4) of a card body (1),
   implanting an integrated circuit into the card body (1), and
   writing a data corresponding to the personalizing data of the card body into a storage area of the integrated circuit.

2. Production method according to claim 1, characterized in that a decorative element (5) is printed simultaneously with the personalizing data (6).

3. Production method according to claim 2, characterized in that it comprises, subsequent to the printing step, the step for coating said surface (4) of the card body (1) with a protective layer (8).

4. Production method according to claim 3, characterized in that it comprises, prior to the step for writing into a storage area, the step for recognizing the personalizing data (6) of the card body (1).

5. Production method according to claim 1, characterized in that it comprises, subsequent to the printing step, the step for coating said surface (4) of the card body (1) with a protective layer (8).

6. Production method according to claim 1, characterized in that it comprises, prior to the step for writing into a storage area, the step for recognizing the personalizing data (6) of the card body (1).

7. Production method according to claim 2, characterized in that it comprises, prior to the step for writing into a storage area, the step for recognizing the personalizing data (6) of the card body (1).

* * * * *